United States Patent
Ford et al.

(10) Patent No.: US 6,392,769 B1
(45) Date of Patent: May 21, 2002

(54) AUTOMATIC LEVEL CONTROL CIRCUIT FOR OPTICAL SYSTEM

(75) Inventors: Joseph Earl Ford, Oakhurst Township, Monmouth County; Wayne Harvey Knox, Holmdel Township, Monmouth County, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/272,976

(22) Filed: Mar. 19, 1999

(51) Int. Cl.[7] .............................................. H04B 10/08
(52) U.S. Cl. ........................ 359/110; 359/124; 359/337
(58) Field of Search ................................. 359/110, 124, 359/161, 173, 194, 337

(56) References Cited

PUBLICATIONS

S. J. B. Yoo et al, "Observation of Prolonged Power Transients in a Reconfigurable Multiwavelength Network and Their Suppression by Gain Clamping of Optical Amplifiers" IEEE Photonics Technology Letters, V10(11), p1659–1661; 1998).

Primary Examiner—Kinfe-Michael Negash
(74) Attorney, Agent, or Firm—John A. Caccuro

(57) ABSTRACT

Feedback instabilities arising from interactions between automatic control loops at the amplifier nodes of an optical network are eliminated by restricting operation to a single amplifier node at a time. Amplifier node activation is accomplished using a global control signal which is sequentially passed from an upstream node through all of the nodes of the system. By controlling the state of the global control signal, an upstream node has operational priority over downstream nodes.

21 Claims, 7 Drawing Sheets

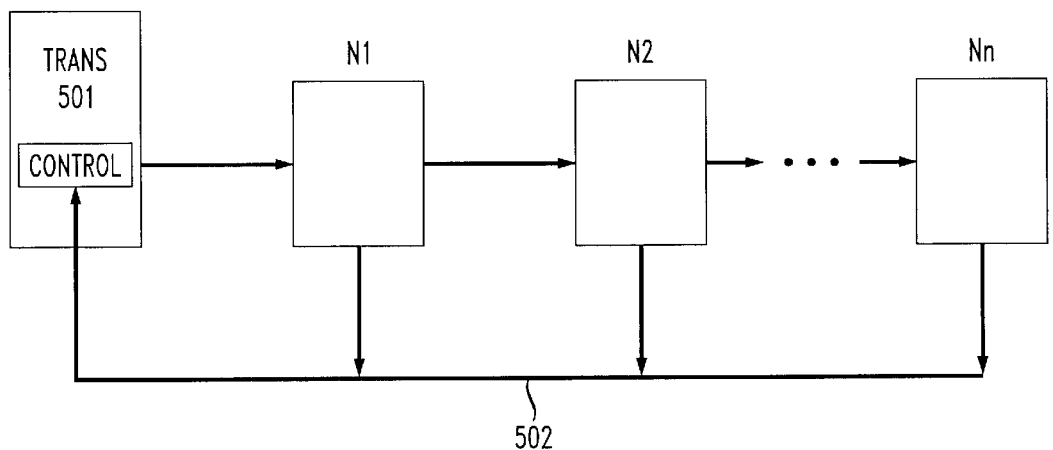

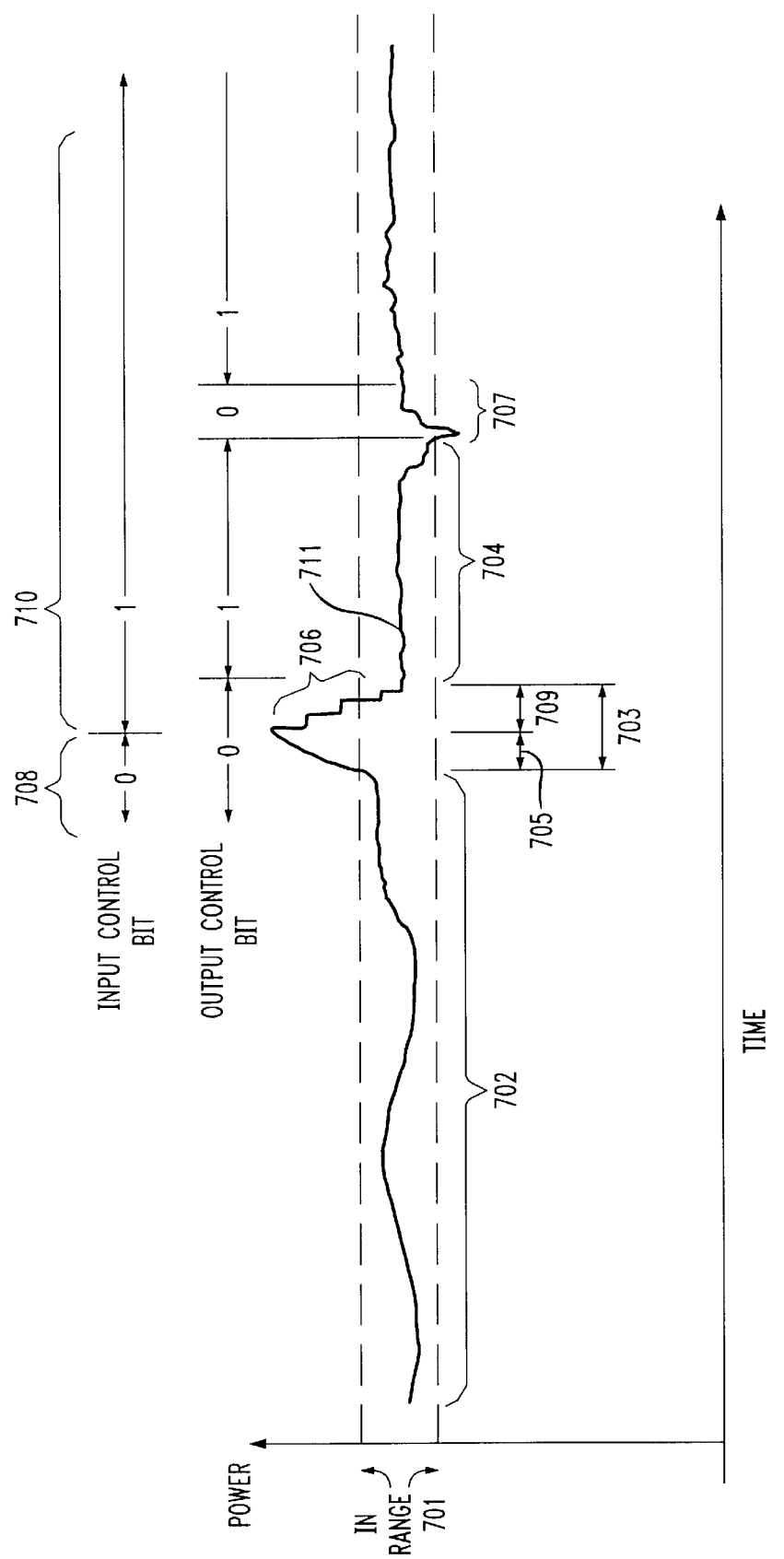

AUTOMATIC LEVEL CONTROL CIRCUIT FOR OPTICAL SYSTEM

TECHNICAL FIELD OF THE INVENTION

This invention relates to optical transmission systems and, more particularly, to a method of and apparatus for providing an automatic level control circuit for nodes of such optical systems.

BACKGROUND OF THE INVENTION

In optical communications systems, it is critical to maintain optical signal levels at their correct power settings. In particular in wavelength division multiplexed (WDM) systems, when a number of optical signals are transmitted and received at different wavelengths, many impairments can arise causing some channels to have a power level that is too high or low. In the case of long distance optical systems in which optical signals generate nonlinear effects such as self-phase or cross-phase modulation, it is desirable to ensure that the power levels in a single optical fiber span of the system remains well-equalized. In such a case, it would be desirable to place an adaptive equalizer in each amplifier node of the system. The time frame at which impairments arise as a result of unequal optical signals levels are extremely varied, from very slow changes occurring over a time span greater than 10 years in the case of component aging, to very fast (microsecond) transients occurring due to WDM add/drop or other protection switching operations.

In general, all of these problems will continue to get worse as more optical communication bandwidth is added to WDM systems, and new ultrabroadband amplifiers and components are developed. Clearly for each WDM system, it will be necessary to carefully optimize the placement of equalizer nodes so as to minimize the collective impairments due to incorrect power levels, crosstalk, self-phase and cross-phase modulation, and receiver penalties.

In each amplifier node of the WDM system it is desirable to maintain the transmitted power within a small range (typically about 1 dB variation). To accomplish power management at a node, it is possible to use an automatic level controller consisting of a power tap into a detector and an adjustable loss element (optical attenuator) with a simple feedback control loop which continuously compares the power level to a desired value, and adjusts the attenuation to maintain the power level at the desired value. However, real WDM networks include cascades of (typically nonlinear) fiber, amplifiers, and loss elements. The resulting system is nonlinear and potentially chaotic, such that when the simple control algorithm described is independently utilized in each span, the result can generate oscillations in power levels which are much worse (larger in amplitude and faster in frequency) than the original level fluctuations which the system is intended to correct. This type of network behavior has been observed by others (e.g., see the article by S. J. B. Yoo et al, "Observation of Prolonged Power Transients in a Reconfigurable Multiwavelength Network and Their Suppression by Gain Clamping of Optical Amplifiers" IEEE Photonics Technology Letters, V1O(11), p1659–1661; 1998). In their case, the power fluctuations were so severe that the use of active level stabilization was abandoned in favor of manual level tuning. In general, manual tuning will not be adequate for the increasingly complex networks being deployed. Further, while this kind of problem can occur in single wavelength networks, it is compounded by inter-wavelength interactions in WDM networks, and grows increasingly difficult to predict as the number of wavelengths increases. Finally, networks which deliberately add and drop wavelengths from a WDM span will need to be dynamically reconfigured.

Therefore what is desired is a simple power level control solution which allows an optical network to perform it's own level stabilization, yet which prevents destructive feedback oscillations.

SUMMARY OF THE INVENTION

In accordance with the method and apparatus of the present invention, we have developed a way of eliminating feedback instabilities arising from interactions between automatic control loops at the amplifier nodes of an optical network by restricting operation to a single amplifier node at a time. Amplifier node activation is accomplished using a global control signal which is sequentially passed from an upstream node through all of the nodes of the system. By controlling the state of the global control signal, an upstream node has operational priority over downstream nodes.

More particularly, in accordance with our invention, an optical control apparatus comprises a control signal monitor and an adjustable optical transmission unit. The control signal monitor is responsive to a detected first state of an input global control signal for outputting a output global control signal at a first state, and is responsive to a detected second state of the input global control signal for outputting the output global control signal at the first state and for generating an enable signal. The adjustable optical transmission unit is responsive to the enable signal for controlling the output signal level of a received input optical signal. The adjustable optical transmission unit is (1) responsive to the enable signal for adjusting the output signal level to a predetermined level and for generating the okay signal when the output signal level adjustment is completed, and (2) responsive to the absence of said enable signal for maintaining the output signal level at its existing level. The control signal monitor is responsive to the okay signal for outputting the output global control signal at a second state.

In accordance with a system aspect of our invention, an optical communication system includes a plurality of optical links with each link including an optical fiber segment and an amplification node and with at least one of the amplification nodes including our above-described signal level control apparatus. Another aspect enables a global controller to receive system node status and to selectively address each system node one at a time to enable power (signal) level adjustments thereat.

According to other aspects of our invention, the adjustable optical transmission unit (1) includes one or more adjustable signal level elements selected from a group including an preamplifier, an amplifier, an attenuator, a filter, and an equalizer and (2) provides one or more types of output signal level adjustments selected from a group including a power level, a signal tilt level, and a level of one or more wavelengths of the output signal.

BRIEF DESCRIPTION OF THE DRAWINGS

In the drawings,

FIG. 5 shows, an illustrative system using centralized control of node having an automatic level control circuit;

FIG. 6 shows an illustrative state diagram of the an automatic level control circuit of FIG. 3;

FIG. 7 shows, illustratively, the operation of a an automatic level control circuit of FIG. 3 in controlling power level variation at a node;

In the following description, identical element designations in different figures represent identical elements. Additionally in the element designations, the first digit refers to the figure in which that element is first located (e.g., 109 is located in FIG. 1).

DETAILED DESCRIPTION

Figure 1:
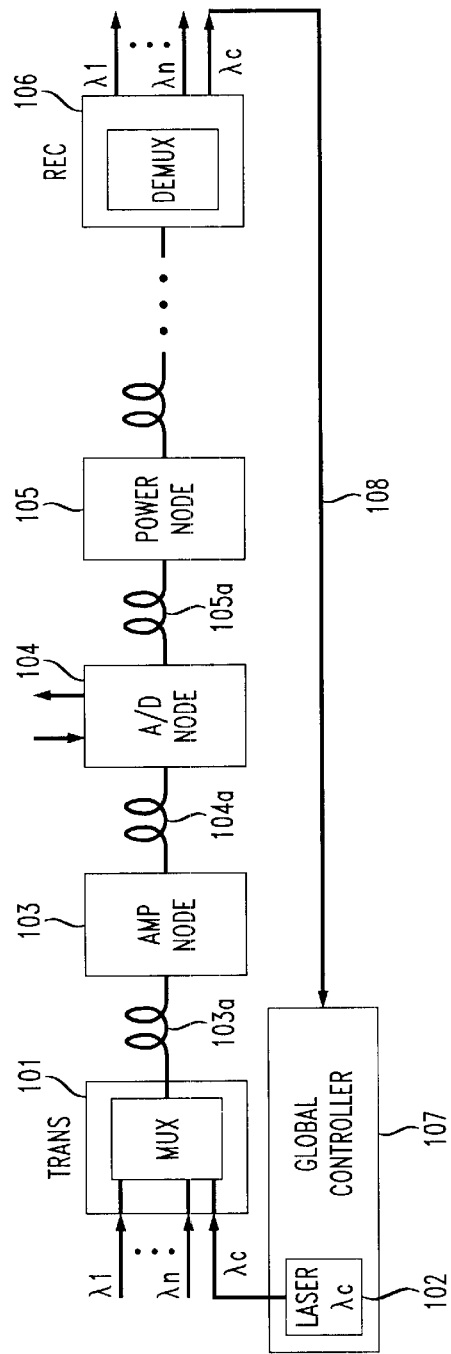
FIG. 1 shows an illustrative block diagram of an wavelength division multiplexed (WDM) system useful in describing the operation of the present invention.

With reference to FIG. 1, there is shown an illustrative block diagram of an wavelength division multiplexed (WDM) system useful in describing the operation of the present invention. While the techniques of the present invention are described for use in a WDM system, it should be noted that the techniques could also be utilized in a single wavelength system. The system includes a transmitter unit 101 having a multiplexer for combining independently data signal modulated wavelengths $\lambda 1-\lambda 8$ and control wavelength $\lambda c$. The control wavelength $\lambda c$, generated by laser 102, provides a control signal for controlling automatic power level adjustment operation at the nodes 103–105 and at receiver 106. The system is shown, illustratively, to include a plurality of optical spans, each including a node 103–105. For illustrative purposes, three types of nodes are shown including an amplifier node 103, an add/drop node 104, and a power equalization node 105. The amplifier node 103 provides only amplification and no equalization. The add/drop node 104 provides amplification and wavelength add/drop capability. The power node 105 provides amplification and equalization. The receiver 106 includes a demultiplexer for demultiplexing the wavelengths $\lambda 1-\lambda 8$ and the control wavelength $\lambda c$. In one embodiment, the control wavelength $\lambda c$ may be returned to a global controller unit 107 to enable centralized selective control of the equalization at nodes 103–105 and receiver 106.

Figure 2:
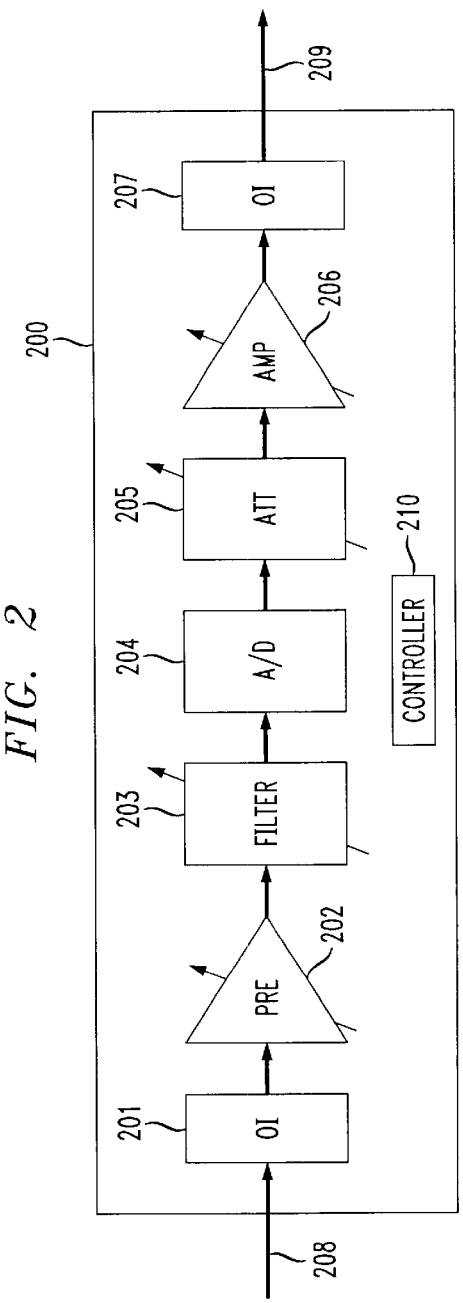
FIG. 2 shows, an illustrative generalized block diagram of a node of the system of FIG. 1.

Shown in FIG. 2 is a generalized block diagram of a node 200 of the system of FIG. 1. While the illustrative node is shown to include an optical isolator 201, preamplifier 202, filter/equalizer 203, optical add/drop multiplexer (OADM) 204, attenuator 205 amplifier 206 and optical isolator 207, any particular node may not include all of these elements. The optical isolators 201 and 207 ensure only unidirectional optical transmission over the node and connecting input fiber 208 and output fiber 209. The preamplifier 201 amplifies optical signals received over fiber 208 and may have an adjustable gain level or gain tilt level, operable under control of controller 210. One example of such a preamplifier 201 is an erbium-doped fiber amplifier (EDFA) as described in the P. F. Wysocki et al article entitled "Broad-Band Erbium-Doped Fiber Amplifier Flattened Beyond 40 nm Using Long-Period Grating Filter," published in IEEE Photonics Technology Letters, Vol. 9, No. 10, pp 1343–1345, Oct. 1997. The filter/equalizer 203 may be a gain flattening filter or a wavelength selective equalizer and may be adjustable under control of controller 210. One example of such a filter/equalizer 203 is described in the article by H. S. Kim et al entitled "All-fiber acousto-optic tunable notch filter with electronically controllable spectral profile," published in Optics Letters, Vol. 22, No. 19, pp 1476, Oct. 1, 1997. The OADM 204 is a wavelength multiplexer/demultiplexer unit that is used to add or drop one or more wavelengths from the WDM signal. One such OADM is described by R. Giles et al in the article entitled "Low loss ADM for DWDM Lightwave Networks," published at IOOC"95, Paper ThC2-1. The attenuator 205 is used to adjust signal levels and may also be adjustable under control of controller 210. The output amplifier 201 amplifies optical signals for transmission over fiber 209 and may have controllable gain level or gain tilt level, operable under control of controller 210. While node 200 has been shown with a variety of adjustable gain/loss/equalizer elements, a node may include only one adjustable element. In general it is easier to have control over multiple local elements because (1) there is more information about the operating state and (2) there is no time between adjustment and effect.

As previously discussed, to carefully optimize system performance it is necessary to determine the type of node utilized (i.e., 103, 104 and 105) at the various system node locations so as to be able to compensate for the various impairments which occur due to WDM channel add/drop reconfiguration, optical protection switching, incorrect power levels, crosstalk, self-phase and cross-phase modulation, etc. Moreover, while it is desirable to automate power level control at these nodes, control must be accomplished without causing the unstable and chaotic power level oscillations described in the previously referenced Yoo article.

As the previously referenced Yoo article discusses, the apparent source of these large power fluctuations is the effect of transient power level changes on the control loop in each node. In other words, since all node power control loops were operating simultaneously, each control circuit was making "decisions" based on optical signal levels which did not, in fact, represent the steady state average level which would result from the current settings on the network. This problem can be mitigated by reducing the speed of the feedback circuit to a rate much slower than any dynamic amplifier effects and signal propagation times. [Single amplifier effects are typically on the order of 100 microseconds, although amplifier cascades react with speeds as fast as 1 microsecond. Fiber nonlinearities have nanosecond time scale responses. And propagation times are given by the link distance (<100 km) divided by the speed of light in the fiber and so, typically, are about 500 microseconds or less)] However, feedback instabilities can still persist even if the response time of the feedback circuit is seconds, and so a control algorithm may require minutes to adequately control the power level at a node. Undesirably, a control algorithm that requires minutes to respond will result in unacceptable network outages.

In accordance with the method and apparatus of the present invention, we have developed a way of eliminating feedback instabilities arising from interactions between automatic control loops at the amplifier nodes of an optical network by restricting operation to a single amplifier node at a time. This is accomplished by having each node operate autonomously under control of a "token passing" type global control algorithm which requires the consent of upstream nodes. This technique uses a single global control signal which is sequentially passed through all of the nodes and which any of the nodes can change from 0 to 1. By controlling the state of the global control signal, an upstream node has operational priority over downstream nodes.

Thus, our automated power level control arrangement is based on selectively enabling ("gating") power level stabilization circuits at each node using a control algorithm (method) responsive to a global control signal. Our automated power level control arrangement can be built into some or all of the system optical nodes to automate the signal power level maintenance of the system. As will be discussed in a later paragraph, our automatic level control circuit may either be self-controlled (210 of FIG. 2) or may be centrally controlled (107 of FIG. 1).

With reference to FIG. 1, recognizing that the flow of information in a fiber optic link is typically only one way, the system described above can be easily implemented using a single wavelength global control signal $\lambda c$ for the global control bit, injected by a continuous light source (e.g., laser 102) at the transmitter 101 location. Each control node has the ability to block the global control signal $\lambda c$ from proceeding further downstream to other nodes (using, for example, one channel of a spectral equalizer). Every node must then continuously monitor the received global control bit, even during level adjustment, and immediately stop its level adjusting process if the control bit goes to 0. This means that the first node (e.g., node 103) always has absolute priority in level control (since blocking the control bit sets it to zero for nodes 104 and 105 along the optical fiber network) and any downstream node has priority over other nodes further downstream. In other words, all nodes must always yield their priority to any upstream node. This type of control algorithm can easily be implemented in hardware by using a control beam power monitor to enable an automatic level control circuit. Using such an arrangement, any power level fluctuation should be corrected in a rolling fashion, starting from the first node which suffers from unacceptable variations, and stopping when the system is first brought within acceptable limits. The use of such an arrangement should minimize the time lag and total system response.

Figure 3:
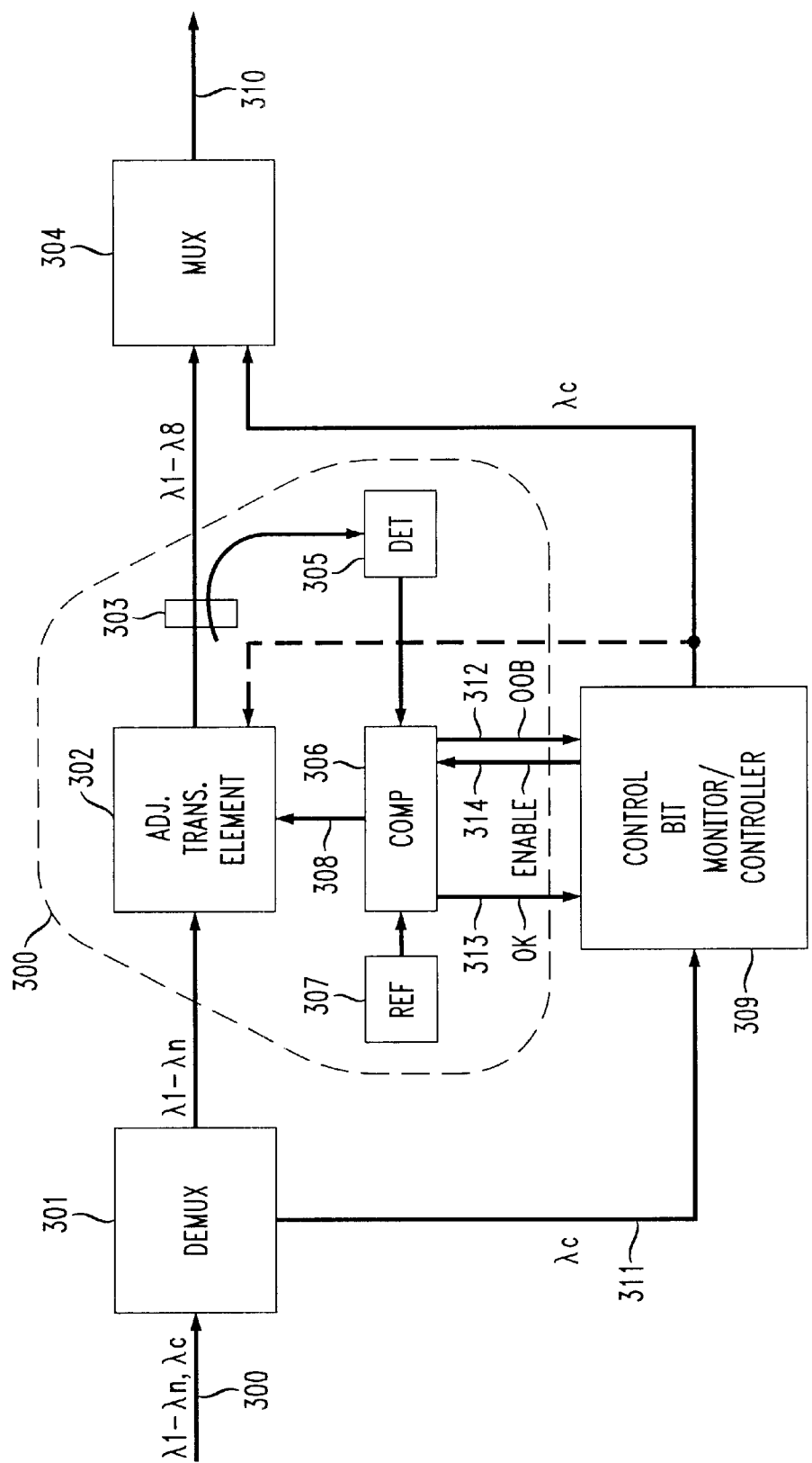
FIG. 3 shows, illustratively, a block diagram of a an automatic level control circuit in accordance with the present invention.

With reference to FIG. 3, there is shown an illustrative block diagram of a generalized automatic level control circuit in accordance with the present invention. The generalized automatic level control circuit is used in the node of FIG. 3 and basically includes a generalized adjustable transmission unit 300 for adjusting the power level of the WDM wavelengths being transmitted through the unit and a control bit monitor/controller 309 which enables the adjustable transmission unit 300 when the control bit is received. Note, the generalized adjustable transmission element 302 may be implemented using an adjustable preamplifier 202 (or amplifier 206), an adjustable filter/equalizer 203, or an adjustable attenuator 205 of FIG. 2. Thus the adjustable element 302 could be an amplifier 202, 206 where the gain is controlled (e.g., by pump laser intensity), a variable attenuator 205 which adjusts all WDM wavelengths simultaneously, a gain-tilting attenuator internal to an amplifier, or a spectral equalizer 203 (e.g., having an individual attenuator for each wavelength). Each of these type of elements 302 would operate under control of the comparator 306. In the following example, we assume that the adjustable transmission unit 302 includes an adjustable amplifier or attenuator for controlling the power level of the WDM signal $\lambda 1 - \lambda n$.

The input WDM optical signal $\lambda 1 - \lambda n$, $\lambda c$ is received, over optical fiber 300, from the system transmitter (101 of FIG. 1) or from a prior node of the system and the control wavelength $\lambda c$ is demultiplexed from $\lambda 1 - \lambda n$ by demultiplexer 301. The transmission wavelengths $\lambda 1 - \lambda n$ are coupled to the adjustable transmission unit 302. The adjusted output of the adjustable transmission unit 302 passes through an optical tap (or coupler) 303 to multiplexer 304. The optical signal detector 305 detects the total power level of the WDM signal. Comparator 306 is enabled by an enable signal 310 from controller 309. The comparator 306 is enabled only in response to an enable signal 314 from controller 309. The controller 309 outputs an enable signal 314 only in response to an active state of control signal (bit) wavelength $\lambda c$, on path 311. The controller also controls the state of the control signal (bit) wavelength $\lambda c$ outputted, via multiplexer 304, to the next node or receiver (106 of FIG. 1) of the system.

When enabled, comparator 306 compares the detected signal from detector 305 against an electrical reference signal from reference unit 307. If the detected signal differs from the reference signal, a transmission control signal 308 from comparator 306 is fedback to unit 302 to control the adjustment of the power level. The comparator 306 outputs an out-of-bounds (OOB) signal 312 to controller 309, indicating that the power level is outside the desired range (see 701 of FIG. 7). When the comparator 306 determines that the detected power level is acceptably close to the reference signal level no further adjustment in power level is made. When power level adjustments are completed, the comparator 306 outputs an okay signal to the controller 309.

In accordance with the present invention, a node (e.g., 105 of FIG. 1) is enabled to readjust its power level if the power level is outside a prescribed range, 701 of FIG. 7, and no upstream node is in the process of adjusting its power level. With reference to FIG. 6, there is shown an illustrative state diagram of the automatic level control circuit of FIG. 3. As shown, when an input global control bit (e.g., the status of control wavelength $\lambda c$ on path 311) is at logic zero state, 601, it indicates that an upstream node is in the process of adjusting its power level. In this state the adjustable transmission element is disabled (irrespective of whether or not the adjustable transmission element indicates that an power adjustment is needed) and the node outputs a control bit at logic zero 602. This output control bit at logic zero, 602, prevents all downstream nodes from readjusting their power levels. When the input global control bit is logic one, 603, it indicates that no upstream node is in the process of adjusting its power level. In this state, if no power adjustment is needed at this node, the node sends an output control bit at a logic one, 604, indicating that the next downstream node can readjust its power level if needed. However, if a power adjustment is needed at the present node, then the node outputs a logic zero signal, 605. At the present node, the power level is adjusted only when it is outside a prescribed range, see 701 of FIG. 7. If at any time an upstream node starts an adjustment of its power level, it changes the state of its output control bit to logic zero thereby signaling that all downstream nodes should cease adjusting their power level at their respective nodes. This technique prevents more than one system node at a time from adjusting its power level. When the power level adjustment is completed a node changes its output control bit status from a logic zero, 605, to a logic one, 604, thereby indicating that the next node has permission to adjust its power level if needed.

Figure 4:
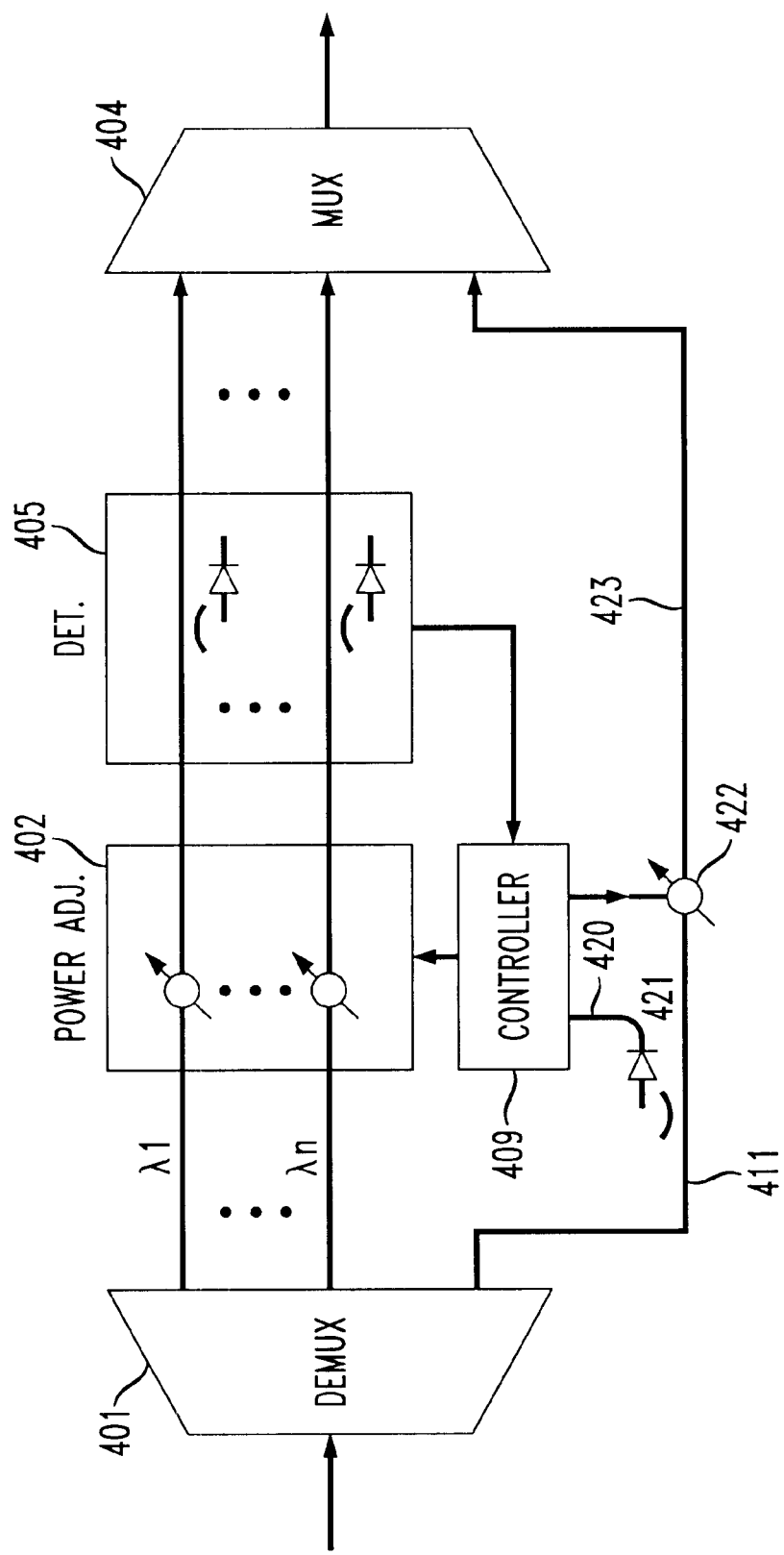
FIG. 4 shows, a first embodiment of the an automatic level control circuit of FIG. 3.

Shown in FIG. 4 is a specific embodiment of our invention. As shown, the demultiplexer 401, multiplexer 404, power adjust element 402, and detector 405 operate in the same manner as the respective elements 301, 304, 302, and 305 of FIG. 3. The controller 409 is responsive to a control signal 411 from detector 421 to enable the detection of signals received from the photo detectors in detector 405. If the detected signal of one or more of the wavelength $\lambda 1 - \lambda n$ is unacceptably different from a reference value for those wavelengths, controller 409 adjusts the associated one or more of the adjustable element units in 402 to bring the power level to the reference level. During this power level adjustment process, controller 409 adjusts digital switch or variable attenuator 422 to generate a logic zero output control signal on path 423. When the power level adjustment process is completed the controller 409 generates a logic one output control signal on path 423.

Figure 9:
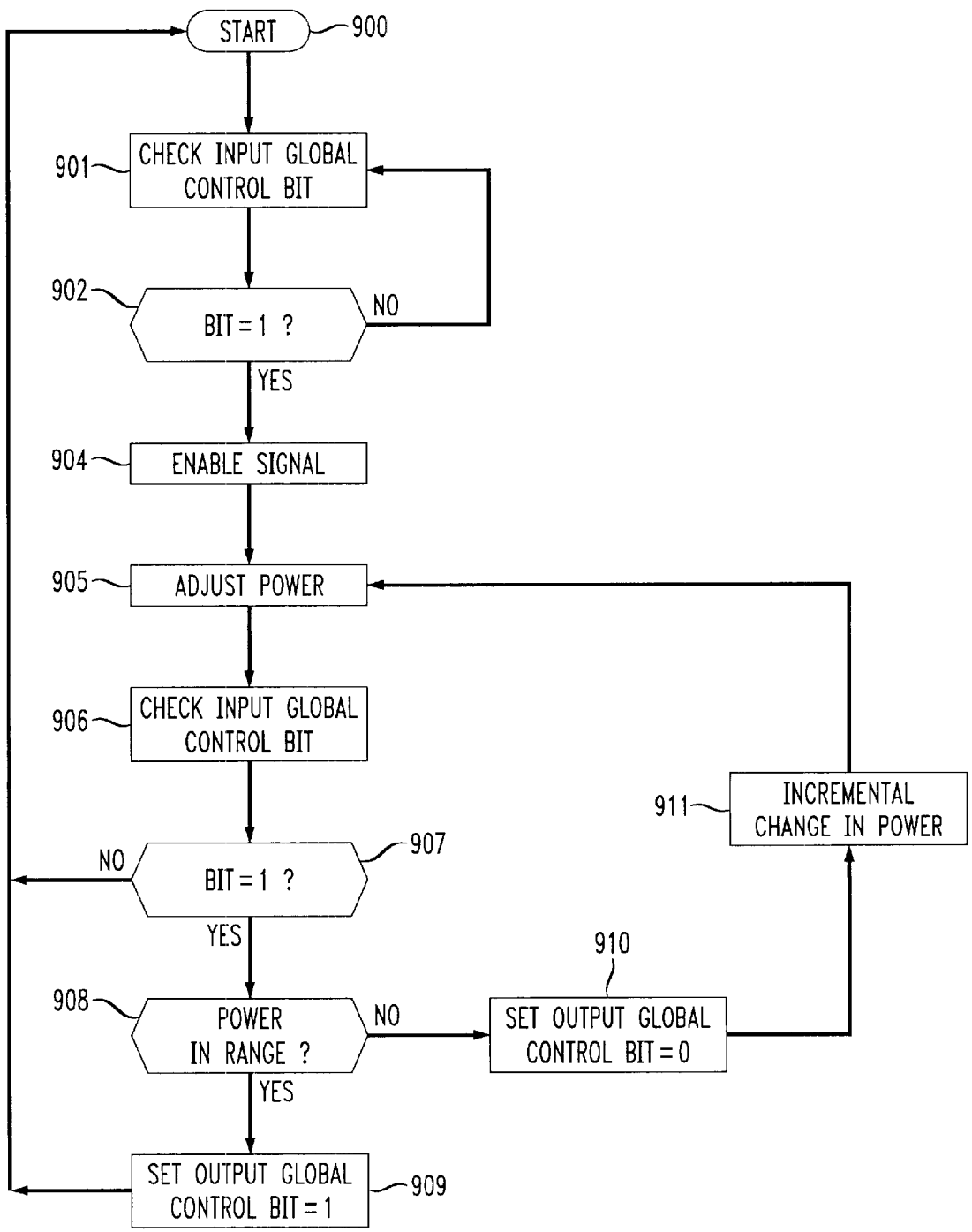
FIG. 9 shows an illustrative flow chart describing the operation the an automatic level control circuit of FIG. 3.

With joint reference to FIGS. 3, 7 and 9 we describe the sequence of operation of the present invention. FIG. 7 shows, illustratively, the range of operation of an automatic level control circuit of FIG. 3 in controlling power level variation at that node. FIG. 9 shows an illustrative flow chart describing the operation the automatic level control circuit of FIG. 3. [Again note that in the following description, the first digit of a referenced element refers to the figure in which that element is located (e.g., 309 is located in FIG. 3)].

From the start state 900, the status of the input global control bit (status of wavelength λc on path 311) is checked in steps 901 and 902 by controller 309. Assume first that the input control bit is logic zero (e.g., no control wavelength λc present on 311), then step 902 is performed and control returns to step 901. The steps 901, 902, and 903 are repeated until an input control bit of logic one is received (e.g., wavelength λc present on 311). At this time 602, controller 309 generates the enable signal 314 (it goes to logic one). In step 905, comparator 306, which is always monitoring the power level, is now enabled to adjust the power level. In step 906, controller 309 again checks the input control bit. If the input control bit has changed to a logic zero, in step 907, meaning that a prior upstream node has started adjusting its power level, then control returns to the start state 900. However, if the control bit is still at logic one, comparator 309 determines, in step 908, if the power level is in range (e.g., see 701 of FIG. 7). If the power level is within range (as in 702 of FIG. 7), then, in step 909, the output control bit is set to logic one indicating that the present node does not need an adjustment and that the next downstream node should be enabled to adjust its power level if needed. Control then returns to the start state 900. However, if the power level is not within range (as during interval 703 of FIG. 7), then comparator 306 signals controller 309 [using a logic one on an out-of-bounds (OOB) signal 312] to set its global output bit to logic zero, step 910, to indicate to other downstream nodes that this node is adjusting its power level. In step 911, the present node proceeds to make an incremental adjustment in its power level. As long as no upstream node has started to perform an adjustment procedure (i.e., input control bit in step 906 remains at zero) the sequence of steps 905, 906, 907, 908, 910 and 911 continues until the power level has returned to its optimum level, 704 of FIG. 7. Note that once an adjustment procedure is started at a node the process does not end as soon as the power level falls within the range 701, but rather continues until the power level reaches its optimum level, 704. Once the power level is adjusted to within a narrowed "optimal range" (indicating that the power is "in range" in step 908) an okay signal 313 is sent from comparator 303 to controller 309. In step 909, the output control bit is set to logic one, indicating that the present node has completed its adjustment process and that the next downstream node can proceed to check its power level.

With reference to FIG. 7, note that during the time interval 705 the power level at the node has risen above the desired range 701 and yet no power readjustment has been started at this node. This is because the input control bit is at logic zero, 708 in the time interval 705, indicating that an upstream node is readjusting its power level. Thus, it is still possible that the power level at the present node can be significantly out of range before that node is enabled to start an adjustment process. When the input control bit becomes logic one in time interval, 710, indicating that an upstream node has completed its power readjustment, the present node proceeds to adjust down its power level, in incremental steps 706. During this time interval 709, the present node also maintains its output control signal at logic zero to prevent downstream nodes from adjusting their power level at the same time. Once the present node has adjusted the power level to its optimum level 711, its output control signal is set to logic one, 704, enabling a downstream node to adjust its power level if needed. Note, that if the power level at the present node were to fall outside the range 701, again, as shown during time 707, then if the received control bit is still at one 710, the present node is enabled to readjust its power level and it indicates this state by setting its output control bit to zero during the readjust interval 707.

Figure 8:
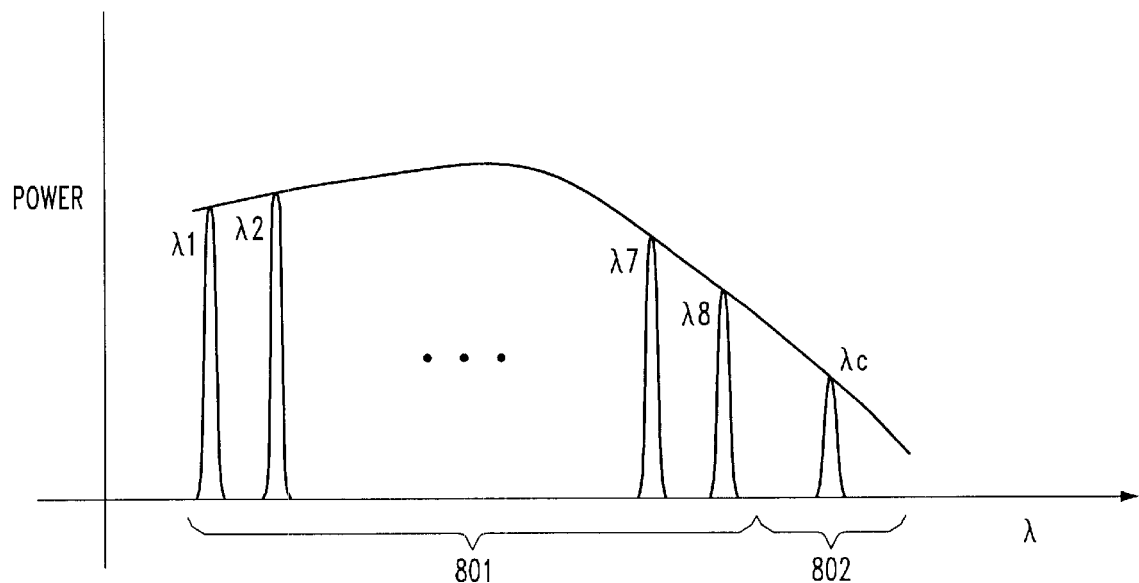
FIG. 8 shows illustrative transmission and control wavelengths used in the system of FIG. 1.

FIG. 8 shows illustrative transmission and control wavelengths used in the system of FIG. 1. The above description has described the control signal (bit) wavelength λc as falling outside, 802, the band 801 of transmission wavelengths λ1–λn. In a WDM network, one of the wavelengths is often used for "Out of band" control and monitoring information being transmitted at a relatively slow data rate. This control channel could be used as the control signal used to switch each individual node, as desired, based on some global information about the network. Since the control bit signaling occurs at a low bit rate, the transmission requirements of the control signal wavelength λc is not too stringent. Consequently, control bit signaling at wavelength λc can be successful in the deteriorated transmission environment of region 802. It should also be noted that the control signal (or bit) could also be modulated as a control channel onto one of the transmission wavelengths λ1–λn. In such an arrangement, a demodulator would be used to detect the control bit rather than the demultiplexer 301 of FIG. 1. A modulator would then be used, rather than the multiplexer 304, to output the control bit over fiber 310.

In this manner, the present invention, instead of allowing continuous feedback operation simultaneously at all network nodes, sequentially enables each of the nodes using a control signal (or control bit). This control signal then either enables the node (enabling adjusting of loss/gain and power levels) or disables the node (maintaining the existing settings for loss/gain).

With reference to FIGS. 1 and 5, there is shown another embodiment including a centralized controller 107 and 501, respectively, used to control when each of the nodes can adjust their power level. In such an arrangement, control signals from each nodes 103—103 (or nodes N1–N3) indicating the status of the total power level (or individual wavelength signal levels) is sent over a return path 108 (or 502) back to the controller 107 (or 501). In the arrangement of FIG. 1, the control signals loop through the nodes and returns over path 108. In this manner the controllers 107 (or 501) can control when readjustment of power level occurs at each node. In FIG. 5, the control signal from each node is returned directly to controller 501 over separate paths 502. Thus, the controller 107 (or 501) monitors the nodes of the network of FIG. 1 (of FIG. 5), respectively, and uses the global control signal to selectively address nodes 103–105 (nodes N1–N3), one at a time, to control power levels at each node of the network. In such an arrangement, the monitor/controller (i.e., 309 of FIG. 3) of each node would include means for detecting its own address signal in the global control signal and in response thereto for generating the enable signal.

What has been described is merely illustrative of the application of the principles of the present invention. Other methods and arrangements can be implemented by those skilled in the art without departing from the spirit and scope of the present invention.

What is claimed is:

1. An optical output signal level control apparatus comprising
    a control signal monitor responsive to a detected first state of an input global control signal for outputting a output global control signal at a first state, and responsive to a detected second state of the input global control signal for outputting the output global control signal at the first state and for generating an enable signal; and
    an adjustable optical transmission unit for receiving an optical signal and for controlling its output signal level, said adjustable optical transmission unit being
    (1) responsive to said enable signal for adjusting the output signal level to a predetermined level and for generating an okay signal when said output signal level adjustment is completed, and
    (2) responsive to the absence of said enable signal for maintaining the output signal level at its existing level; and wherein
    said control signal monitor is responsive to said okay signal for outputting the output global control signal at a second state.

2. The apparatus of claim 1 wherein the adjustable optical transmission unit includes one or more adjustable signal level elements selected from a group including an preamplifier, an amplifier, an attenuator, a filter, and an equalizer.

3. The apparatus of claim 1 wherein the adjustable optical transmission unit provides one or more types of output signal level adjustments selected from a group including a power level, a signal tilt level, and a level of one or more wavelengths of the output signal.

4. The apparatus of claim 1 wherein the global control signal uses a wavelength which is outside a transmission band of the optical signal.

5. The apparatus of claim 1 wherein the optical signal is a wavelength division multiplexed (WDM) signal.

6. The apparatus of claim 5 wherein the global control signal is transmitted over one of the wavelengths of the WDM signal.

7. The apparatus of claim 1 wherein the adjustable optical transmission unit includes
    a detector for detecting the output optical signal level;
    a reference signal;
    a comparator, responsive to the enable signal, for comparing the detected output optical signal level with the reference signal and for generating a control signal; and wherein
    an adjustable transmission element responsive to the control signal for adjusting the output optical signal level.

8. The apparatus of claim 7 wherein the comparator is activated only when the detected output optical signal level falls outside a predetermined range around the reference signal.

9. A method of controlling an output optical signal level of an optical apparatus comprising the steps of:

in response to a detected first state of an input global control signal, outputting a output global control signal at a first state and maintaining an output signal level of a received optical signal at its existing level;
    in response to a detected second state of the input global control signal, outputting the output global control signal at the first state and generating an enable signal;
    in response to said enable signal, adjusting the output signal level to a predetermined level and generating a signal level okay signal when this output signal level adjustment step is completed; and
    in response to said received okay signal, outputting the output global control signal at a second state.

10. An optical communication system including a plurality of optical links, each link including an optical fiber segment and an amplification node, at least one of the amplification nodes including an optical output signal level control apparatus comprising
    a control signal monitor, responsive to a first state of a received input global control signal, for outputting a output global control signal at a first state and, responsive to a detected second state of the input global control signal, for outputting the output global control signal at the first state and for generating an enable signal; and
    an adjustable optical transmission unit for receiving an optical signal and for controlling its output signal level, said adjustable optical transmission unit
    (1) responsive to said enable signal for adjusting the output signal level to a predetermined level and for generating an okay signal when said output signal level adjustment is completed, and
    (2) responsive to the absence of said enable signal for maintaining the output signal level at its existing level; and wherein
    said control signal monitor is responsive to a received okay signal for outputting the output global control signal at a second state.

11. The system of claim 10 wherein the system further comprises
    an optical signal source for generating an original global control signal at a second state and sending said original global control signal to a first amplification node of the system.

12. The system of claim 10 wherein the system further comprises
    a global controller for receiving a global control signal from the last amplification node of the system and for controlling the state of said original optical signal source generated by said optical signal source.

13. The system of claim 10 wherein at said at least one of the amplification node
    said control signal monitor includes means for detecting its own address signal in said global control signal and in response thereto for generating said enable signal, and
    wherein the system further comprises
    a global controller for receiving a global control signal outputted from each of said at least one amplification node of the system and for addressing an global control signal to identify which of said at least one amplification node of the system is to be enabled.

14. The system of claim 10 wherein the adjustable optical transmission unit includes one or more adjustable signal level elements selected from a group including an preamplifier, an amplifier, an attenuator, a filter, and an equalizer.

15. The system of claim 10 wherein the adjustable optical transmission unit provides one or more types of output signal level adjustments selected from a group including a power level, a signal tilt level, and a level of one or more wavelengths of the output signal.

16. The system of claim 10 wherein the global control signal uses a wavelength which is outside a transmission band of the optical signal.

17. The system of claim 10 wherein the optical signal is a wavelength division multiplexed (WDM) signal.

18. The system of claim 16 wherein the global control signal is transmitted over one of the wavelengths of the WDM signal.

19. The system of claim 10 wherein the adjustable optical transmission unit includes a detector for detecting the output optical signal level;

a reference signal;

a comparator, responsive to the enable signal, for comparing the detected output optical signal level with the reference signal and for generating a control signal; and wherein an adjustable transmission element responsive to the control signal for adjusting the output optical signal level.

20. The system of claim 19 wherein the comparator is activated only when the detected output optical signal level falls outside a predetermined range around the reference signal.

21. A method of operating an optical communication system including a plurality of optical links, each link including an optical fiber segment and an amplification node, comprising the steps of:

in response to a detected first state of an input global control signal received over a first fiber segment, outputting a output global control signal at a first state over a second fiber segment and maintaining an output signal level of an optical signal received over the first fiber segment at its existing level;

in response to a detected second state of the input global control signal, outputting the output global control signal at the first state and generating an enable signal;

in response to said enable signal, adjusting the output signal level to a predetermined level and generating an okay signal when this output signal level adjustment step is completed; and in response to said okay signal, outputting the output global control signal at a second state.

* * * * *